(12) United States Patent
Clauss et al.

(10) Patent No.: US 11,142,161 B2
(45) Date of Patent: Oct. 12, 2021

(54) BELT DEFLECTOR

(71) Applicant: Joyson Safety Systems Germany GmbH, Aschaffenburg (DE)

(72) Inventors: Yves Clauss, Potsdam (DE); Heinrich Einsiedel, Ulm (DE); Gerhard Frey, Steinheim (DE); Peter Linde, Blaustein (DE); Rainer Mangold, Merklingen (DE); Thomas Bertram, Senden (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 409 days.

(21) Appl. No.: 16/088,370

(22) PCT Filed: Mar. 9, 2017

(86) PCT No.: PCT/DE2017/200023
§ 371 (c)(1),
(2) Date: Sep. 25, 2018

(87) PCT Pub. No.: WO2017/162244
PCT Pub. Date: Sep. 28, 2017

(65) Prior Publication Data
US 2020/0298791 A1    Sep. 24, 2020

(30) Foreign Application Priority Data
Mar. 25, 2016    (DE) .................... 10 2016 205 068.0

(51) Int. Cl.
*B60R 22/185*    (2006.01)
*B60R 22/20*    (2006.01)
*B60R 22/18*    (2006.01)

(52) U.S. Cl.
CPC .......... *B60R 22/201* (2013.01); *B60R 22/185* (2013.01); *B60R 2022/1818* (2013.01)

(58) Field of Classification Search
CPC . B60R 22/185; B60R 22/1855; B60R 22/202; B60R 2022/1818;
(Continued)

(56) References Cited

U.S. PATENT DOCUMENTS

| 4,208,770 A | 6/1980 | Takada |
| 5,870,816 A * | 2/1999 | McFalls ............. A44B 11/2553 24/170 |

(Continued)

FOREIGN PATENT DOCUMENTS

| CN | 1075926 A | 9/1993 |
| CN | 1081975 A | 2/1994 |

(Continued)

OTHER PUBLICATIONS

International Search Report dated Jun. 30, 2017 issued in PCT/DE2017/200023.
(Continued)

*Primary Examiner* — Barry Gooden, Jr.
(74) *Attorney, Agent, or Firm* — Gordon Rees Scully Mansukhani, LLP

(57) ABSTRACT

The invention relates to a belt deflector with a main element (100) that can be attached to the structure of a vehicle, and with a belt support element (200) that is movable relative to the main element (100) and forms a support surface (231) or support edge for a safety belt (20) to be deflected.
According to the invention, the belt deflector comprises an intermediate element (300, 400) that is deformed when the movable belt support element (200) is moved relative to the main element (100), in the direction of the intermediate element (300, 400), and because of this deformation is pressed against the safety belt (20).

14 Claims, 10 Drawing Sheets

Figure 1:
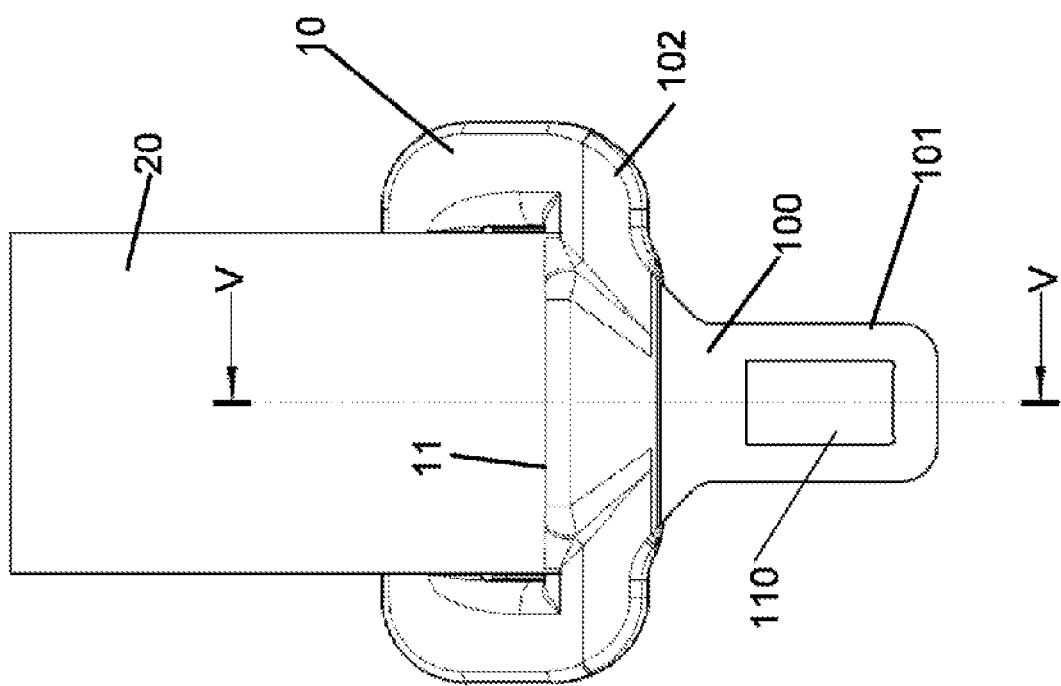

(58) Field of Classification Search
CPC . B60R 2022/1812; A44B 11/02; A44B 11/06; A44B 11/10; A44B 11/16; A44B 11/2553; A44B 11/2561; A44B 11/2569
See application file for complete search history.

(56) References Cited

U.S. PATENT DOCUMENTS

| | | | | |
|---|---|---|---|---|
| 6,138,328 | A * | 10/2000 | Iseki | B60R 22/24 24/197 |
| 6,324,730 | B1 * | 12/2001 | Iseki | B60R 22/24 24/197 |
| 8,474,106 | B2 | 7/2013 | Richter et al. | |
| 8,793,844 | B2 | 8/2014 | McFalls et al. | |
| 2009/0025293 | A1 | 1/2009 | Fyhr | |
| 2012/0068520 | A1 | 3/2012 | McFalls et al. | |
| 2012/0198660 | A1 | 8/2012 | Richter et al. | |
| 2015/0173461 | A1 | 6/2015 | Okano et al. | |
| 2016/0000190 | A1 * | 1/2016 | Knoedl | A44B 11/10 24/171 |
| 2016/0159315 | A1 * | 6/2016 | Moeker | B60R 22/18 24/183 |
| 2017/0355349 | A1 * | 12/2017 | Betz | B60R 22/1855 |
| 2019/0135224 | A1 * | 5/2019 | Krambeck | B60R 22/1855 |
| 2019/0152427 | A1 * | 5/2019 | Wang | A44B 11/2557 |
| 2019/0351868 | A1 * | 11/2019 | Yao | B60R 22/28 |
| 2020/0359750 | A1 * | 11/2020 | Inishi | A44B 11/25 |

FOREIGN PATENT DOCUMENTS

| | | |
|---|---|---|
| CN | 1135433 A | 11/1996 |
| CN | 203611923 U | 5/2014 |
| CN | 204432597 U | 7/2015 |
| DE | 10 2004 023 394 A1 | 12/2005 |
| DE | 10 2014 109 740 A1 | 1/2016 |
| EP | 1 983 857 B1 | 7/2009 |
| WO | WO 2006/092206 A1 | 9/2006 |
| WO | WO 2013/099590 A1 | 7/2013 |
| WO | WO 2015/025801 A1 | 2/2015 |

OTHER PUBLICATIONS

Chinese First Office Action dated Jul. 2, 2020 issued by the Chinese Patent Office in related Chinese Patent Application No. 201780015135.7.

* cited by examiner

BELT DEFLECTOR

The invention relates to a belt deflector, comprising a main element which is fastenable to a vehicle structure, and a belt contact element which is movable in relation to the main element and forms a contact surface or contact edge for a seat belt which is to be deflected.

Such a belt deflector is known, for example, from International Patent Application WO 2006/092206. In the case of the previously known belt deflector, a movable belt contact element can move in the direction of a positionally fixed main element of the belt deflector counter to the force of a spiral spring. Owing to the movement of the belt contact element, a clamping element is pressed outward perpendicularly to the direction of movement of the belt contact element via a wedge surface coupling, as a result of which a slot, through which the seat belt is passed, is reduced in size; clamping of the seat belt in the slot occurs.

The invention is based on the object of configuring a belt deflector of the described type in a particularly simple and cost-effective manner.

This object is achieved according to the invention by a belt deflector with the features as claimed in patent claim 1. Advantageous refinements of the belt deflector according to the invention are indicated in dependent claims.

According thereto, it is provided according to the invention that the belt deflector has a deformable intermediate element which—during a relative movement of the movable belt contact element relative to the main element and in the direction of the intermediate element—in particular in the presence of a tensile force acting on the belt deflector—deforms and is pressed against the seat belt by said deformation.

A substantial advantage of the belt deflector according to the invention can be seen in the fact that the intermediate element can be deformed in the event of a tensile force of the seat belt, wherein—differently than in the case of the prior art described at the beginning—said intermediate element is itself pressed directly against the seat belt and acts on the latter. For example, it can be provided that, by means of the deformation of the intermediate element, a slot, through which the seat belt is passed, is reduced in size, and/or, by means of the deformation of the intermediate element, the friction of the seat belt against the intermediate element is increased.

The deformable intermediate element can be deformable plastically and/or deformable elastically. A plastically deformable intermediate element can be composed, for example, of PP plastic, and an elastically deformable intermediate element can be composed of rubber.

In the case of an elastically deformable intermediate element, an advantage consists in that the intermediate element can carry out a dual function: firstly, the intermediate element can serve to act as a spring element and—in the absence of a tensile force of the seat belt which is to be deflected—to bring the belt contact element relative to the main element into a predetermined starting position. In the event of a tensile force of the seat belt, the intermediate element can be deformed, wherein the latter, as mentioned, carries out a second function, namely to be pressed itself directly against the seat belt and to act on the latter.

With regard to the arrangement of the components, it is considered advantageous if the intermediate element is arranged, in particular clamped, between the main element and the belt contact element.

It is particularly advantageous if the belt deflector has a slot for the passage of the seat belt, one edge of the slot is formed by the main element and the opposite edge of the slot is formed by the intermediate element, and the slot width of the slot is determined by the respective deformation state of the intermediate element.

The belt deflector is preferably formed by a plug-in tongue for a belt buckle of a seat belt system. Such a plug-in tongue preferably has a plug-in portion which is suitable for plugging into the belt buckle, and a slot for the passage of the seat belt.

The movable belt contact element is preferably held by the main element so as to be displaceable linearly along a predetermined sliding direction. The sliding direction preferably corresponds to the direction of the force which the seat belt exerts on the belt deflector.

With regard to a simple structural design, it is considered advantageous if the movable belt contact element is U-shaped and has two side portions arranged parallel, and a base portion connecting the two side portions. The intermediate element is preferably arranged between the two side portions arranged parallel. The outer side of the base portion preferably forms a contact surface for the seat belt and the inner side of the base portion forms a clamping surface for the intermediate element.

With regard to the mounting of the belt contact element, it is considered advantageous if the belt contact element has, on an outer side, a first guide pin which projects into a first guide groove of the main element and is guided by said guide groove, and, on an opposite outer side, has a second guide pin which projects into a second guide groove of the main element and is guided by said guide groove.

The first and second guide grooves are preferably arranged parallel. The two side portions, which are arranged parallel, of the U-shaped belt contact element are preferably arranged between said two guide grooves.

The intermediate element is preferably clamped between a first clamping surface, which is formed by the movable belt contact element, and a second clamping surface, which is arranged parallel to the first clamping surface and is formed by the main element. The respective distance between the first and the second clamping surface can thus determine the deformation state of the intermediate element.

With regard to the holding of the intermediate element, it is considered advantageous if said intermediate element has two outer web portions (or plug-in portions) which are arranged parallel and between which a central portion which is thicker in relation thereto is arranged. One of the two web portions is preferably plugged into a holding groove in the belt contact element and is held by said holding groove; the other of the two web portions is preferably plugged into a holding groove in the main element and is held by said holding groove.

The holding groove in the belt contact element is preferably adjacent to the first clamping surface and the holding groove in the main element is adjacent to the second clamping surface. The central portion of the intermediate element is preferably clamped between the two clamping surfaces.

It is also advantageous if, on that side of the intermediate element which faces away from the slot, a further elastically and/or plastically deformable intermediate element is arranged, in particular clamped, between the main element and the belt contact element. The further intermediate element is preferably likewise deformed during a relative movement of the movable belt contact element and is pressed by the deformation—preferably with an increase in the friction of the seat belt against the belt deflector—against a portion of the seat belt that lies opposite that portion of the seat belt which is located in the slot.

The main element preferably comprises a metal core which is coated in sections with plastic or is embedded therein. That edge of the slot which is delimited by the main element is preferably formed by a portion of the main element that is coated with plastic or is embedded therein.

With regard to the manufacturing, it is considered advantageous if the holding groove in the main element has a groove wall which is formed by the metal core, and the opposite groove wall and the groove base are formed by the plastic.

The intermediate element or the intermediate elements are preferably composed of at least one or more of the following materials or at least also have one or more of the following materials: styrene, butadiene; styrene acrylate, pure acrylate, vinyl acetate, styrene-butadiene rubber, chloroprene rubber, butadiene rubber (BR), acrylonitrile-butadiene rubber (NBR), butyl rubber (IIR), ethylene-propylene-diene rubber (EPDM), chloroprene rubber (CR), polyisoprene rubber (IR), rubber and/or PUR.

In order to protect the seat belt, it can also be of advantage for the clamping to be stronger in the center of the seat belt or stronger in the center of the slot than in the edge region. This is because if the clamping is too strong in the edge region, the seat belt could begin to tear. In order to achieve clamping to a greater extent or predominantly in the center, it is considered advantageous if one of the clamping surfaces or both clamping surfaces in the slot region are formed spherically or convexly in cross section, or, in other words, the slot is designed to be narrower in the center of the seat belt than at the edges of the seat belt.

Figure 3:
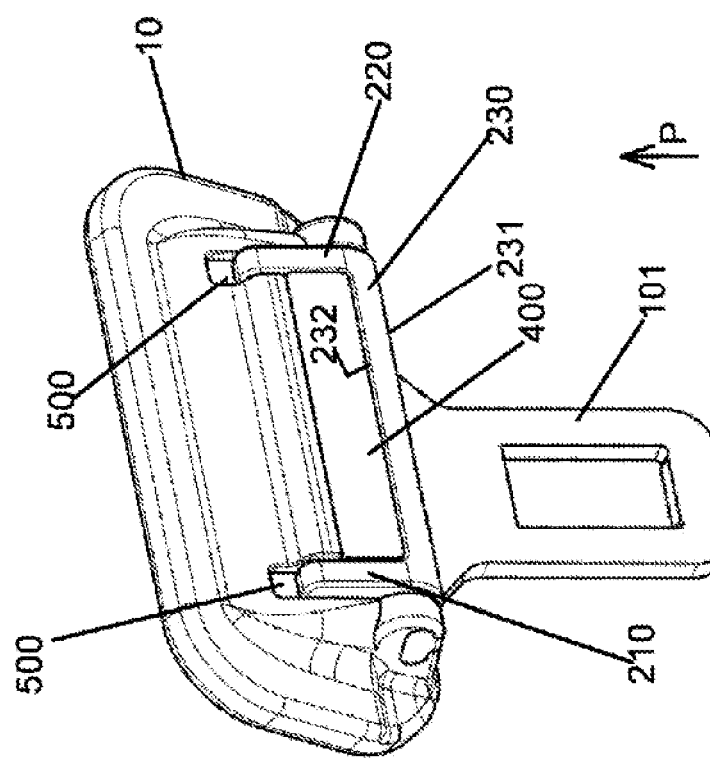
Figure 2:
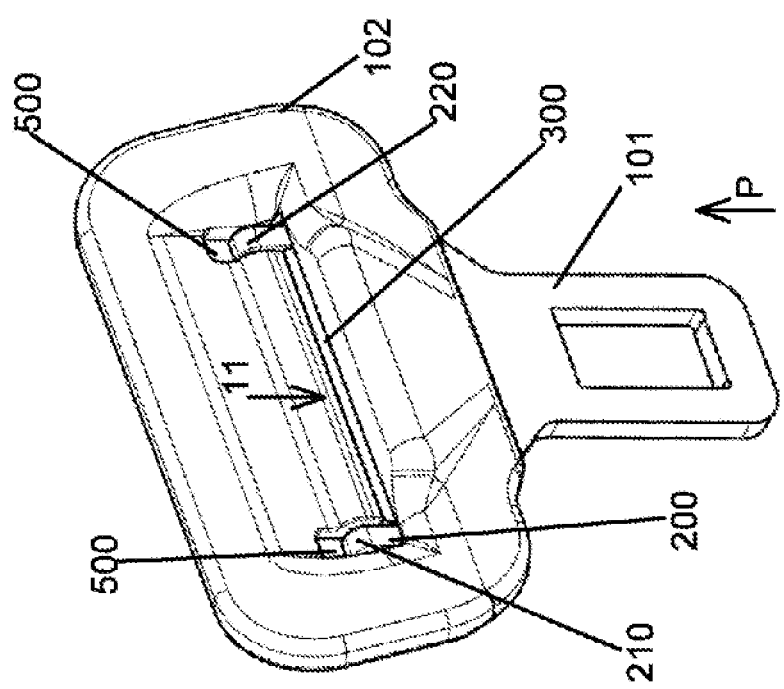
Figure 4:
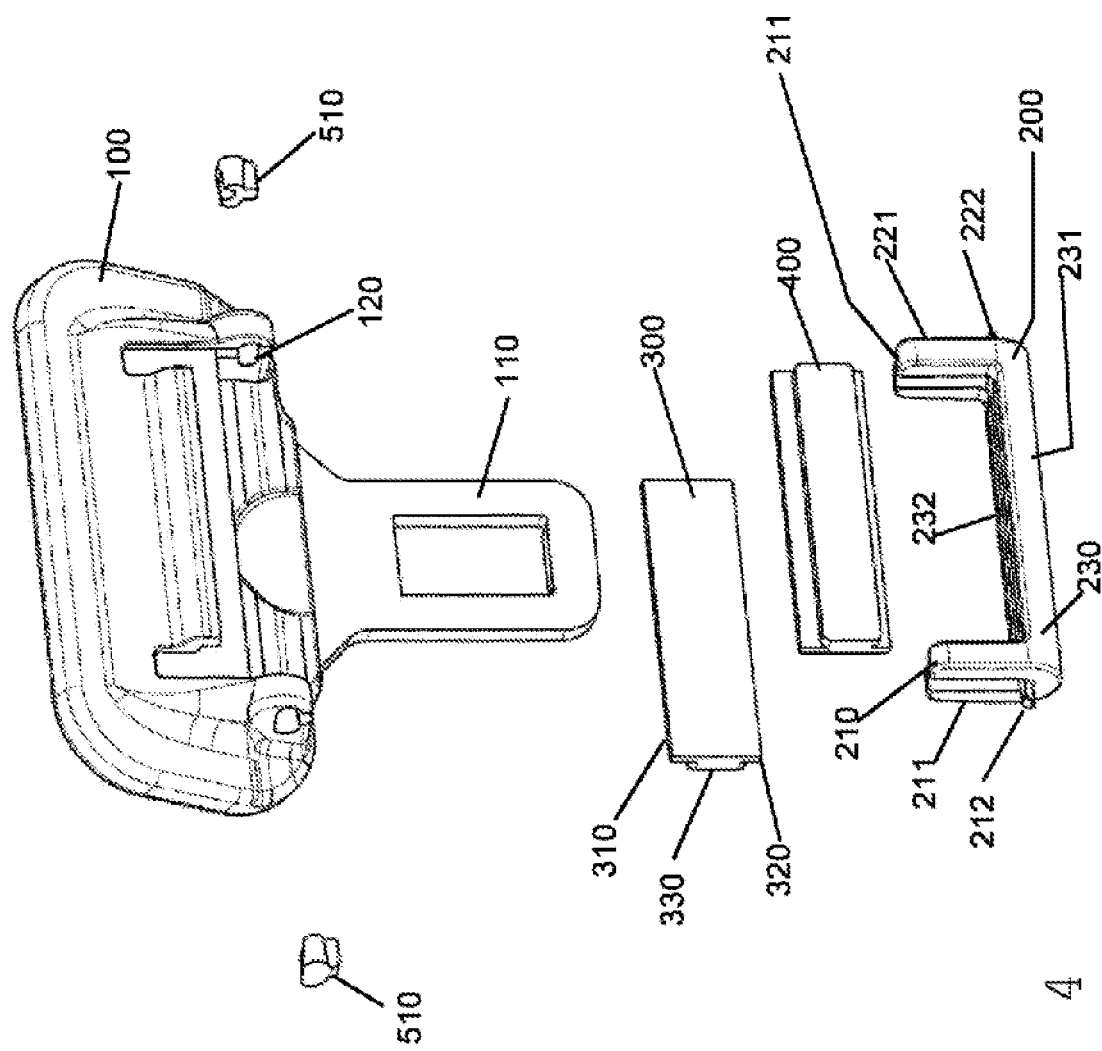
Figure 5:
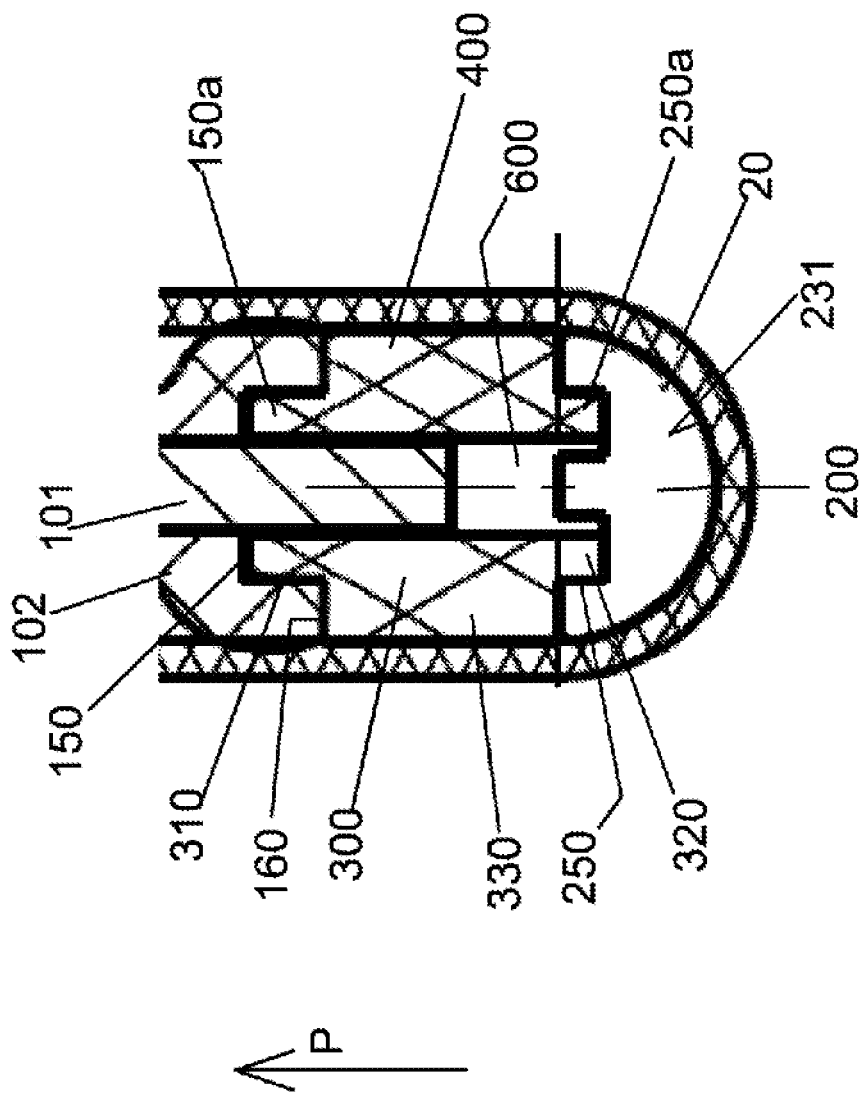
Figure 7:
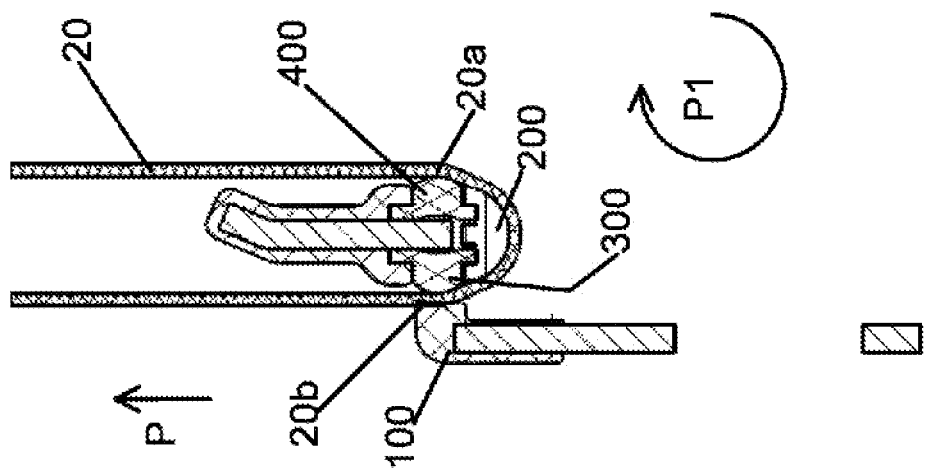
Figure 6:
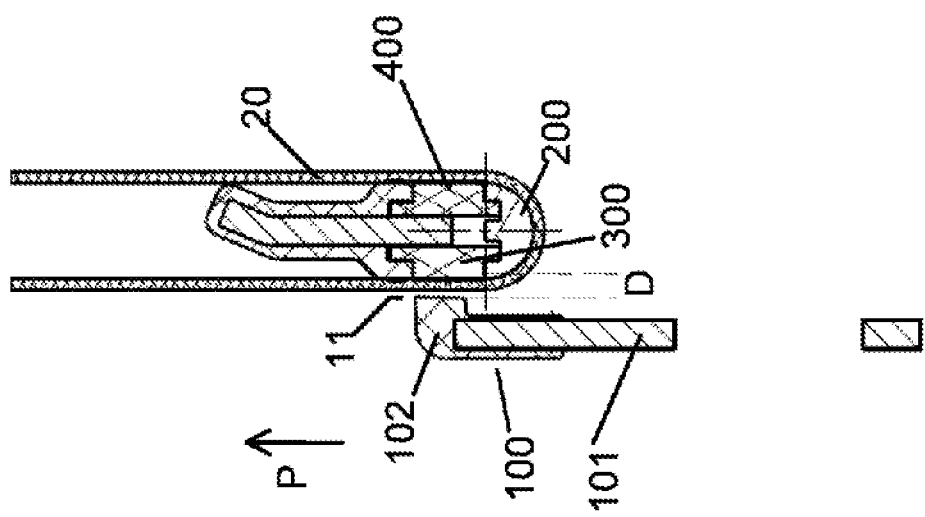
Figure 9:
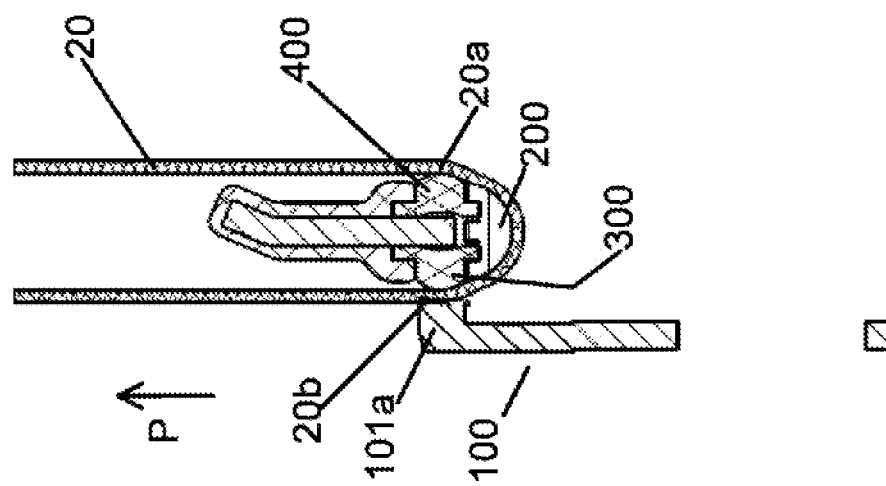
Figure 8:
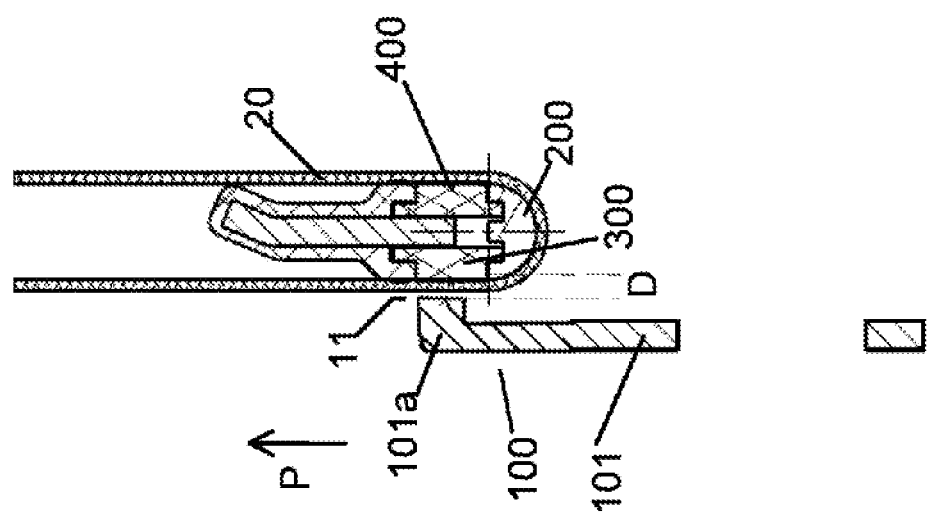
Figure 11:
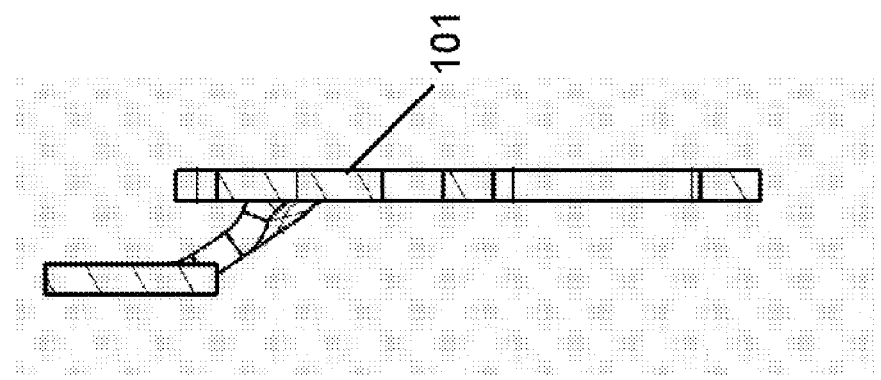
Figure 10:
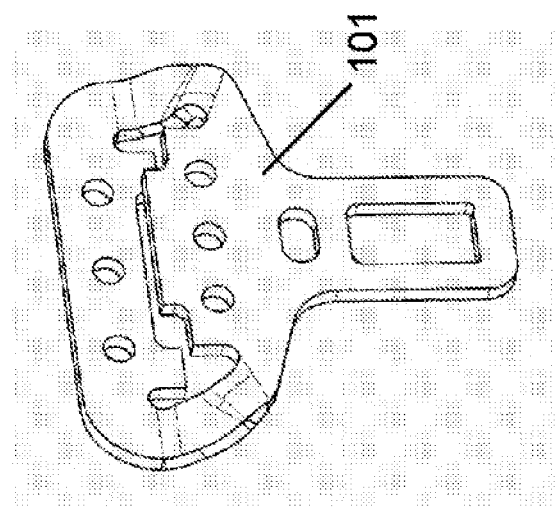
Figure 13:
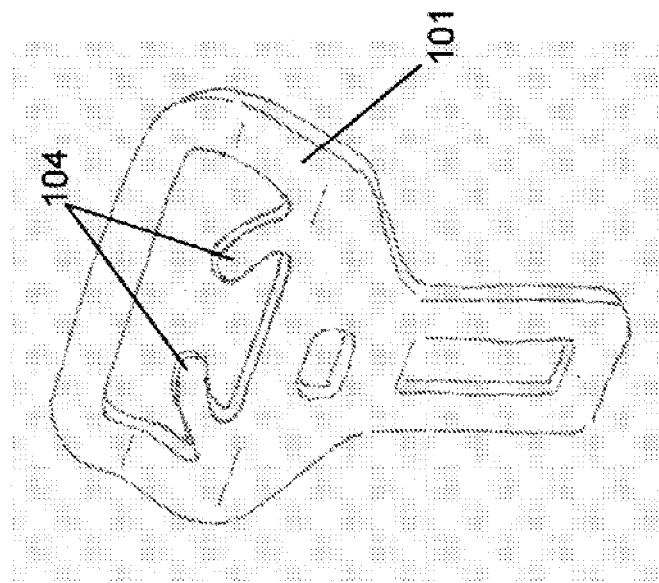
Figure 12:
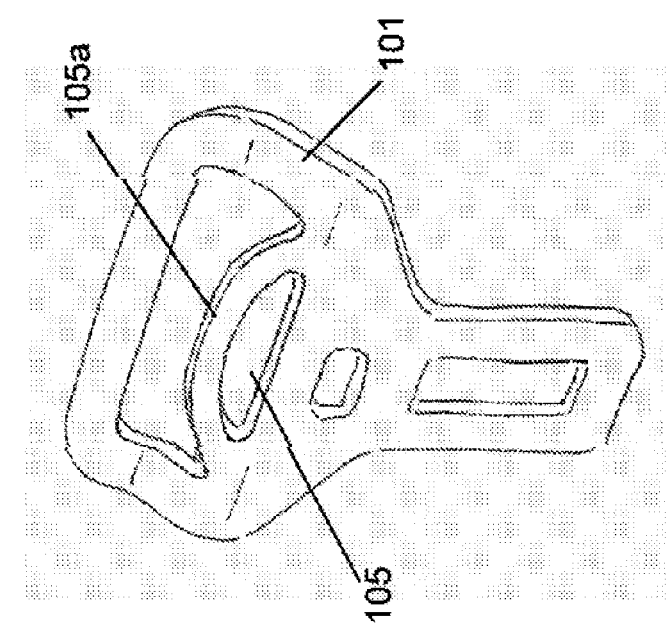
Figure 15:
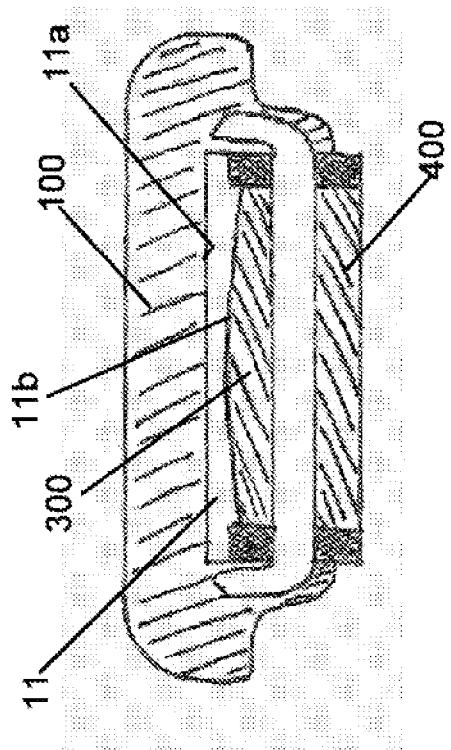
Figure 14:
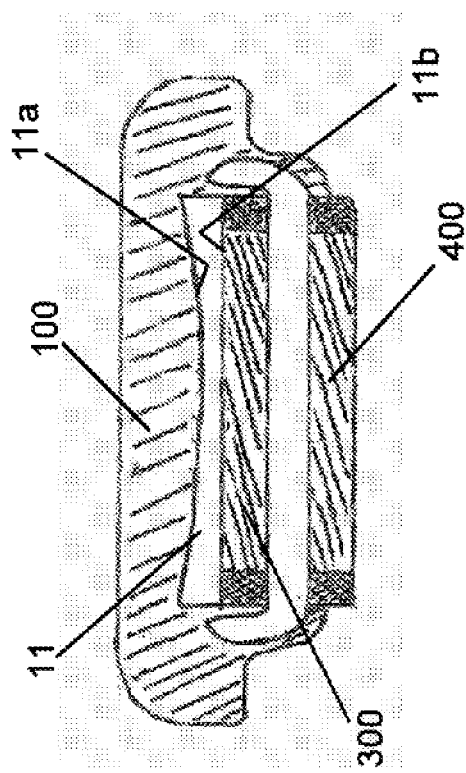
Figure 17:
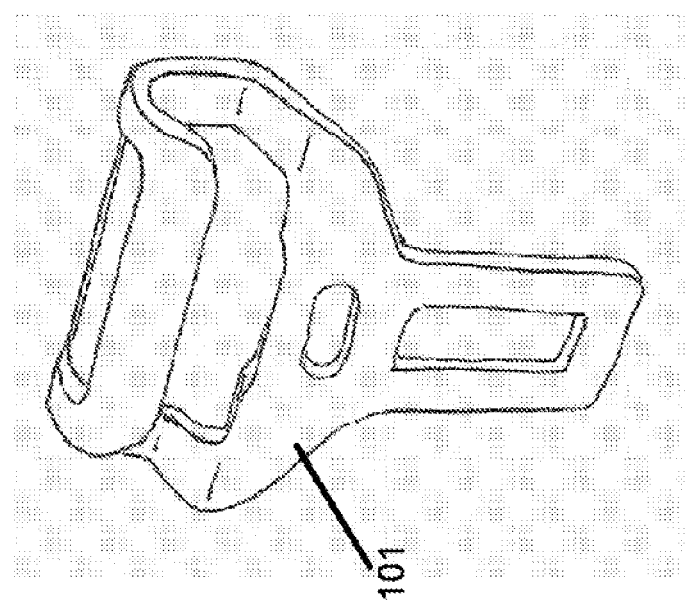
Figure 16:
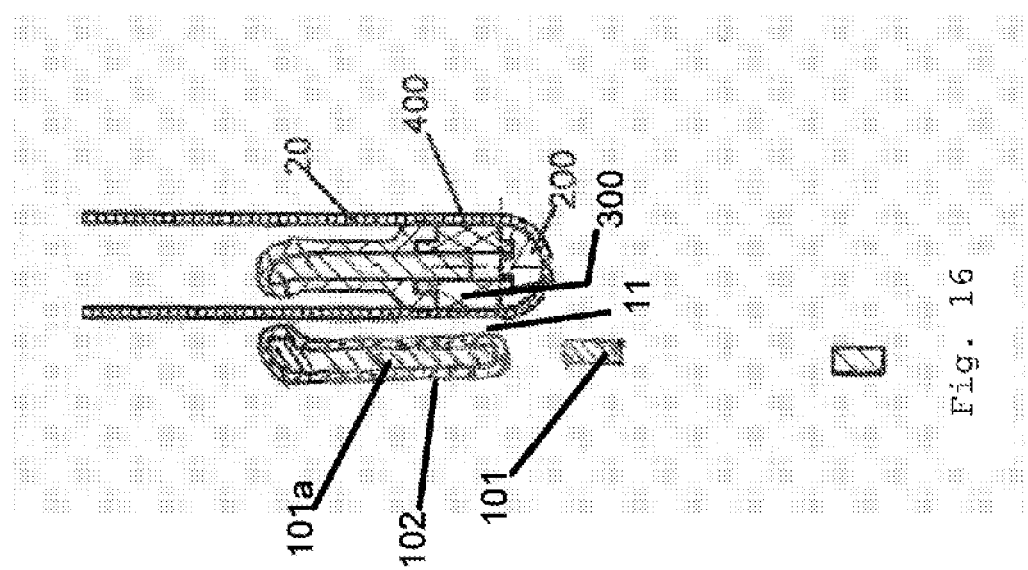

The invention is explained in more detail below with reference to exemplary embodiments; by way of example here FIG. 1 shows an exemplary embodiment for a belt deflector according to the invention in a top view, FIG. 2 shows the belt deflector according to FIG. 1 in a three-dimensional illustration obliquely from one side, FIG. 3 shows the belt deflector according to FIG. 1 in a three-dimensional illustration obliquely from the other side, FIG. 4 shows the components of the belt deflector according to FIG. 1 in an exploded illustration, FIG. 5 shows the arrangement of elastic intermediate elements within the belt deflector according to FIG. 1 more specifically in detail, FIG. 6 shows the belt deflector according to FIG. 1 in the relaxed state without action of a tensile force by the seat belt, FIG. 7 shows the belt deflector according to FIG. 1 during action of a tensile force by the seat belt, FIG. 8 shows a further exemplary embodiment for a belt deflector in the relaxed state without action of a tensile force by the seat belt, FIG. 9 shows the belt deflector according to FIG. 8 during action of a tensile force by the seat belt, FIG. 10 shows, in a three-dimensional illustration, an exemplary embodiment for a metal core with an undercut, FIG. 11 shows the metal core according to FIG. 10 in cross section, FIGS. 12-13 show, in a three-dimensional illustration, further exemplary embodiments for metal cores with an undercut, FIGS. 14-15 show exemplary embodiments for clamping slots with a spherical or convex shaping for the purpose of clamping the seat belt predominantly centrally, FIG. 16 shows yet another exemplary embodiment for a belt deflector in the relaxed state without action of a tensile force by the seat belt, and FIG. 17 shows, in a three-dimensional illustration, the metal core of the belt deflector according to FIG. 16 more specifically in detail.

For the sake of clarity, the same reference signs are always used for identical or comparable components in the figures.

FIG. 1 shows, in a top view, a belt deflector in the form of a plug-in tongue 10. The plug-in tongue 10 comprises a main element 100 which is fastenable to a vehicle structure and is formed by a metal core 101 which is coated in sections with plastic 102 or is embedded in plastic 102. The metal core 101 can be formed by a punched and bent-over metal plate or a punched and bent-over metal sheet. A front portion of the metal core 101 forms a plug-in portion 110 of the plug-in tongue 10 which can be plugged into a belt buckle (not illustrated in FIG. 1 for clarity reasons) and can be latched there.

The plug-in tongue 10 serves as a belt deflector for a seat belt 20; for this purpose, the seat belt 20 can be passed through a slot 11 in the plug-in tongue 10.

FIG. 2 shows the plug-in tongue 10 according to FIG. 1 in a three-dimensional view obliquely from the side. The slot 11 through which the seat belt 20 according to FIG. 1 is passed can be seen.

Furthermore, FIG. 2 shows that, in addition to the fastenable main element 100, the plug-in tongue 10 comprises a belt contact element 200, which is movable in relation to the main element 100, and an elastic intermediate element 300. Of the belt contact element 200, only two side portions 210 and 220 arranged parallel can be seen; the elastic intermediate element 300 is likewise substantially concealed.

FIG. 3 shows the plug-in tongue 10 according to FIGS. 1 and 2 in a three-dimensional view obliquely from the other side. It can be seen that the belt contact element 200 is U-shaped and, in addition to the two side portions 210 and 220 arranged parallel, has a base portion 230 connecting the two side portions 210 and 220.

The outer side of the base portion 230 forms a contact surface 231 for the seat belt 20 according to FIG. 1. The inner side of the base portion 230 forms a clamping surface 232 for the elastic intermediate element 300, lying thereabove, according to FIG. 2, and for a further elastic intermediate element 400 which is arranged parallel to the elastic intermediate element 300. The two intermediate elements 300 and 400 are arranged between the two side portions 210 and 220 arranged parallel.

The two intermediate elements 300 and 400 are preferably composed of at least one or more of the following materials or at least also have one or more of the following materials: styrene, butadiene; styrene acrylate, pure acrylate, vinyl acetate, styrene-butadiene rubber, chloroprene rubber, butadiene rubber (BR), acrylonitrile-butadiene rubber (NBR), butyl rubber (IIR), ethylene-propylene-diene rubber (EPDM), chloroprene rubber (CR), polyisoprene rubber (IR), rubber and/or PUR.

As is explained even more specifically in detail further below, the belt contact element 200 is movable upward along the arrow direction P and can deform the two elastic intermediate elements 300 and 400 during a relative movement relative to the main element 100. In FIGS. 2 and 3, clearances which permit a relative movement of the belt contact element 200 or of the two side portions 210 and 220 upward along the arrow direction P are identified by the reference sign 500.

FIG. 4 shows the components of the plug-in tongue 10 according to FIG. 1 in an exploded illustration. The fastenable main element 100 with the plug-in portion 110 thereof, which permits latching to an external belt buckle, is seen. Furthermore, the belt contact element 200 which is movable in relation to the main element 100 and is of U-shaped design is seen. The outer side of the base portion 230 of the belt contact element 200 forms the contact surface 231 for the seat belt 20 according to FIG. 1; the inner side of the base portion 230 forms a clamping surface 232 on which the elastic intermediate element 300 and the further elastic intermediate element 400 can be supported.

FIG. 4 furthermore shows two guide pins 212 and 222, of which one is arranged, in particular is integrally formed, on the outer side 211 of the side portion 210 and the other is arranged, in particular integrally formed, on the outer side 221 of the side portion 220 of the belt contact element 200. The two guide pins 212 and 222 are guided in two guide grooves which are formed in the main element 100. The two guide grooves in the main element 100 are preferably arranged parallel. The two parallel side portions 210 and 220 of the belt contact element 200 are located at least in sections between said two guide grooves of the main element 100. Of the two guide grooves, only one can be seen in FIG. 4 and is identified there by the reference sign 120.

FIG. 4 furthermore reveals that the elastic intermediate element 300 has an outer web portion or plug-in portion 310 at the top in FIG. 4, an outer web portion or plug-in portion 320 at the bottom in FIG. 4, and a thicker central portion 330 located in between. As is explained in more detail further below, within the scope of the assembly, the lower web portion 320 is plugged into a holding groove in the base portion 230 of the belt element 200 and the upper web portion 310 is plugged into a holding groove in the main element 100.

The further elastic intermediate element 400 can be identical to the elastic intermediate element 300. Accordingly, the further elastic intermediate element 400 is likewise plugged into an associated holding groove in the belt contact element 200 and into a corresponding associated holding groove in the main element 100.

Within the scope of the assembly of the components of the plug-in tongue 10, first of all the two elastic intermediate elements 300 and 400 are plugged into the holding grooves provided for this purpose in the U-shaped belt contact element 200. Subsequently, the belt contact element 200 is introduced with its guide pins 212 and 222 into the guide grooves (cf. reference sign 120), which are provided for this purpose and are arranged parallel, in the main element 100. Subsequently, in order to avoid the belt contact element 200 slipping out of the guide grooves, locking stoppers 510 are plugged in and form a lower stop for the guide pins 212 and 222 of the belt contact element 200.

FIG. 5 shows the arrangement of the two elastic intermediate elements 300 and 400 between the U-shaped belt contact element 200 and the main element 100 more specifically in detail. A holding groove 250 in the belt contact element 200 is revealed, into which the outer web portion 320 of the elastic intermediate element 300 is plugged. The holding groove 250 is located next to a clamping surface 232 on which the central portion 230 of the intermediate element 300 is supported.

FIG. 5 furthermore shows a holding groove 150 in the main element 100, said holding groove serving for receiving the outer web portion 310 of the elastic intermediate element 300. The holding groove 150 in the main element 100 has a groove wall which is formed by the metal core 101 of the main element 100. The opposite groove wall and the groove base of the holding groove 150 are formed by the plastic 102 of the main element 100.

A clamping surface 160 of the main element 100, on which the central portion 330 of the intermediate element 300 is supported, is located next to the holding groove 150.

FIG. 5 also shows the arrangement of the further elastic intermediate element 400. It can be seen that the further elastic intermediate element 400 is plugged into a holding groove 150a in the main element 100 and into a holding groove 250a in the belt contact element 200. The fastening or arrangement of the further intermediate element 400 therefore corresponds to the arrangement of the elastic intermediate element 300.

The seat belt 20 which lies against the contact surface 231 formed by the outer side of the base portion 230 can also be seen in FIG. 5.

FIG. 5 furthermore shows a clearance 600 which is provided between the belt contact element 200 and the main element 100 and permits a relative movement of the belt contact element 200 upward along the arrow direction P in FIG. 5 in the direction of the main element 100; in the case of such a relative movement, the two elastic intermediate elements 300 and 400 are deformed, as is explained below in conjunction with FIGS. 6 and 7.

FIG. 6 shows the plug-in tongue 10 according to FIGS. 1 to 5 in a cross section. The slot 11 through which the seat belt 20 is passed can be seen.

One edge of the slot 11 is formed by the main element 100, in particular by a portion of the main element 100 that is coated with plastic 102; the opposite edge of the slot 11 is formed by the elastic intermediate element 300, in particular by the thicker central portion 330 of the intermediate element 300. The slot width D of the slot 11 is therefore determined by the respective deformation state of the intermediate element 300.

FIG. 6 shows the case in which the seat belt 20 does not exert any significant tensile force on the belt contact element 200. For this reason, the two elastic intermediate elements 300 and 400 are not deformed or at least are not significantly deformed, and therefore the slot 11 in the plug-in tongue 10 has a distance D which permits a low-friction movement of the seat belt 20 through the slot 11. In other words, the slot width D of the slot 11 is greater than the thickness of the seat belt 20 as long as the intermediate element 300 is not deformed.

FIG. 7 shows the components of the plug-in tongue 10 in the event of a tensile force of the seat belt 20 along the arrow direction P. It can be seen that the seat belt pulls the belt contact element 200 upward, as a result of which the two intermediate elements 300 and 400 are deformed.

Owing to the deformation of the elastic intermediate element 300, the slot width D of the slot 11 is significantly reduced, and the seat belt 20 is clamped between the elastic intermediate element 300 and the opposite edge of the main element 100. The clamping fixes the seat belt 20 in the slot 11, but at least the friction of the seat belt 20 is increased during movement through the slot 11.

It can furthermore be seen that, by means of the deformation of the further intermediate element 400, the latter is pressed against a portion 20a of the seat belt 20 that lies opposite that portion 20b of the seat belt 20 which is located in the slot 11. By counter-pressing of the further elastic intermediate element 400 against the seat belt 20, the friction of the seat belt 20 in the region of the plug-in tongue 10 is increased even further such that slipping of the seat belt 20 along the plug-in tongue 10 is made difficult.

As can be seen in FIGS. 6 and 7, the elastic intermediate element 300 and/or the elastic intermediate element 400 are themselves pressed directly against the seat belt 20 by the deformation and thereby increase the friction.

Furthermore, the further intermediate element 400 can have a further function, namely can serve to influence the movement behavior of the belt contact element 200 along the arrow direction P, i.e. upward in FIGS. 6 and 7, in a specific manner. For example, the further intermediate element 400 can prevent rotation or tilting of the belt contact element 200 clockwise according to the arrow direction P1 in FIG. 7 and can force a purely translatory movement of the belt contact element 200 along the arrow direction P; such a behavior should be anticipated if the intermediate element 300 and the further intermediate element 400 have the same or approximately the same deformation behavior.

Alternatively, the further intermediate element 400 can also specifically permit rotation or tilting of the belt contact element 200, for example clockwise according to the arrow direction P2 in FIG. 7, in order to increase the action of force on the seat belt 20 and therefore the friction even further; such a tilting should be anticipated if the intermediate element 300 is softer or has a lower Shore hardness than the further intermediate element 400.

FIGS. 8 and 9 show a further exemplary embodiment for a belt deflector in the form of a plug-in tongue in cross section. It can be seen that that edge of the slot 11 which is on the right in FIGS. 8 and 9 is delimited laterally by the intermediate element 300—as in the case of the exemplary embodiment according to FIGS. 6 and 7. Unlike in the case of the exemplary embodiment according to FIGS. 6 and 7, that edge of the slot 11 which is on the left in FIGS. 8 and 9 is formed by a portion 101a of the metal core 101, i.e. not by the plastics casing, as a result of which the stability of the slot at the intersection with the main element 100 is increased.

The slot delimitation, which is shown in FIGS. 8 and 9, by means of a portion 101a of the metal core 101 can be achieved, for example, by a fork-shaped shaping of the metal core 101 or by a shaping of the metal core 101 with an undercut.

FIG. 10 shows a punched metal core 101 which is bent over and can form a core of a plug-in tongue 10 or a core of a belt deflector. FIG. 11 shows the metal core 101 in cross section. It can be seen that the metal core 101 forms an undercut, by means of which the slot delimitation by means of the metal core according to FIGS. 8 and 9 becomes possible.

FIGS. 12 and 13 show further exemplary embodiments for bent-over metal cores 101 with an undercut. In the variant embodiment according to FIG. 12, an elongated hole 105 has been punched into the initial metal sheet; the resulting upper web 105a has subsequently been bent upward.

Alternatively, the upper web 105a in FIG. 12 can be severed or omitted, and two web portions 104 can be produced which are individually bent upward.

Furthermore, it is possible in an advantageous manner to specifically adjust the extent of the friction on both sides of the seat belt 20 in the slot 11, either to adjust it identically or to be specifically different. For example, the surface configuration (e.g. in respect of material selection and roughness, e.g. with or without a fluting or the like) of the intermediate element 300 and the surface configuration (e.g. in respect of material selection and roughness, e.g. with or without a fluting or the like) of the plastic 102 in the slot region in the case of the embodiment according to FIGS. 6 and 7 can be configured identically or differently in order to achieve the desired distribution of friction. In a corresponding manner, the surface configuration (e.g. in respect of material selection and roughness, e.g. with or without a fluting or the like) of the intermediate element 300 and the surface configuration (e.g. in respect of roughness and/or a possible additional coating) of the portion 101a of the metal core 101 in the slot region in the case of the embodiment according to FIGS. 8 and 9 can be configured identically or differently in order to achieve the desired distribution of friction.

In a corresponding manner, the friction on the further intermediate element 400 can be adjusted as desired by the surface configuration (e.g. in respect of material selection and roughness, e.g. with or without a fluting or the like).

In order to protect the seat belt 20, it can also be of advantage for the clamping to be greater in the center of the seat belt 20 or greater in the center of the slot 11 than in the edge region. This is because if the clamping is too great in the edge region, the seat belt 20 could begin to tear. In order to achieve clamping to a greater extent or predominantly in the center, one of the clamping surfaces 11a or 11b in the slot region (cf. FIGS. 14 and 15) or the two clamping surfaces 11a and 11b can be formed spherically or convexly in cross section. FIG. 14 shows a variant in which the main element 100 (either the metal core 101 thereof or the plastic 102) is formed spherically or convexly in cross section; FIG. 15 shows a variant in which the intermediate element 300 is formed spherically or convexly in cross section.

FIG. 16 shows yet another exemplary embodiment for a bent-over metal core 101 with an undercut. In the case of the variant embodiment according to FIG. 16, the slot 11 on one clamping side is delimited by a portion 101a of the metal core 11 that is coated with plastic 102 and on the opposite side by the intermediate element 300. That is to say, as in the case of the variant according to FIGS. 6 and 7, the seat belt 20 rests on the plastic 102 when the intermediate element 300 is deformed, but in addition there is mechanical support by means of the inner or embedded metal core 101.

FIG. 17 shows the metal core 101 according to FIG. 16 in a three-dimensional view obliquely from the side.

Although the invention has been illustrated and described more specifically in detail by preferred exemplary embodiments, the invention is not restricted by the disclosed examples and other variations can be derived therefrom by a person skilled in the art without departing from the scope of protection of the invention.

LIST OF REFERENCE SIGNS

10 Plug-in tongue
11 Slot
11a Clamping surface
11a Clamping surface
20 Seat belt
20a Portion
20b Portion
100 Main element
101 Metal core
101a Portion of the metal core
102 Plastic
104 Web portion
105 Elongated hole
105a Upper web
110 Plug-in portion
120 Guide groove
150 Holding groove 150a Holding groove
160 Clamping surface
200 Belt contact element
210 Side portion
211 Outer side
212 Guide pin
220 Side portion
221 Outer side
222 Guide pin
230 Base portion
231 Contact surface
232 Clamping surface
250 Holding groove
250a Holding groove
300 Intermediate element
310 Upper web portion
320 Lower web portion
330 Central portion
400 Intermediate element
500 Clearances
510 Locking stopper
600 Clearance
D Distance, slot width
P Arrow direction
P1 Arrow direction

The invention claimed is:

1. A belt deflector, comprising
a main element which is fastenable to a vehicle structure, and
a belt contact element which is movable in relation to the main element and forms a contact surface or a contact edge for a seat belt which is to be deflected,
wherein the belt deflector has a deformable intermediate element which—during a relative movement of the movable belt contact element relative to the main element and in a direction of the intermediate element—deforms and is pressed against the seat belt by said deformation;
wherein
the movable belt contact element (200) is U-shaped and has two side portions (210, 220) arranged parallel, and a base portion (230) connecting the two side portions (210, 220),
the intermediate element (300, 400) is arranged between the two side portions (210, 220) arranged parallel, and
an outer side of the base portion (230) forms the contact surface (231) for the seat belt (20) and an inner side of the base portion (230) forms a clamping surface (232) for the intermediate element (300, 400).

2. The belt deflector as claimed in claim 1, wherein the intermediate element (300, 400) is arranged, in particular clamped, between the main element (100) and the belt contact element (200).

3. The belt deflector as claimed in claim 1, wherein
the belt deflector is a plug-in tongue (10) for a belt buckle of a seat belt system, and
the plug-in tongue (10) has a plug-in portion (110) suitable for plugging into the belt buckle, and a slot (11) for passage of the seat belt (20).

4. The belt deflector as claimed in claim 1, wherein
the movable belt contact element (200) is held by the main element (100) so as to be displaceable linearly along a predetermined sliding direction.

5. The belt deflector as claimed in claim 1, wherein a sliding direction corresponds to a direction of force which the seat belt (20) exerts on the belt deflector.

6. The belt deflector as claimed in claim 1, wherein
the belt deflector has a slot (11) for passage of the seat belt (20),
one edge of the slot (11) is formed by the main element (100) and an opposite edge of the slot (11) is formed by the intermediate element (300), and
a slot width (D) of the slot (11) is determined by the respective deformation state of the intermediate element (300).

7. The belt deflector as claimed in claim 6, characterized in that
the main element (100) comprises a metal core (101) which is coated in sections with plastic (102) or is embedded therein, and
that edge of the slot (11) which is delimited by the main element (100) is formed by a portion of the main element (100) that is coated with plastic (102) or is embedded therein.

8. A belt deflector, comprising
a main element which is fastenable to a vehicle structure, and
a belt contact element which is movable in relation to the main element and forms a contact surface or a contact edge for a seat belt which is to be deflected,
wherein the belt deflector has a deformable intermediate element which—during a relative movement of the movable belt contact element relative to the main element and in a direction of the intermediate element—deforms and is pressed against the seat belt by said deformation;
wherein
the belt contact element (200) has, on an outer side (211), a first guide pin (212) which projects into a first guide groove (120) of the main element (100) and is guided by said guide groove, and
on an opposite outer side (221) has a second guide pin (222) which projects into a second guide groove (120) of the main element (100) and is guided by said guide groove, and
the first and second guide groove (120) are arranged parallel, and the two side portions (210, 220), which are arranged parallel, of the U-shaped belt contact element (200) are arranged between the two guide grooves (120).

9. A belt deflector, comprising
a main element which is fastenable to a vehicle structure, and
a belt contact element which is movable in relation to the main element and forms a contact surface or a contact edge for a seat belt which is to be deflected,
wherein the belt deflector has a deformable intermediate element which—during a relative movement of the movable belt contact element relative to the main element and in a direction of the intermediate element—deforms and is pressed against the seat belt by said deformation;
wherein
the intermediate element (300, 400) is clamped between a first clamping surface (232), which is formed by the movable belt contact element (200), and a second clamping surface (160), which is arranged parallel to the first clamping surface and is formed by the main element (100), and
a respective distance between the first and the second clamping surface (232, 160) determines the deformation state of the intermediate element (300, 400).

10. A belt deflector, comprising
a main element which is fastenable to a vehicle structure, and
a belt contact element which is movable in relation to the main element and forms a contact surface or a contact edge for a seat belt which is to be deflected,
wherein the belt deflector has a deformable intermediate element which—during a relative movement of the movable belt contact element relative to the main element and in a direction of the intermediate element—deforms and is pressed against the seat belt by said deformation; and
wherein
the belt deflector has a slot for passage of the seat belt,
one edge of the slot is formed by the main element and an opposite edge of the slot is formed by the intermediate element, and
a slot width of the slot is determined by the respective deformation state of the intermediate element; and
wherein on a side of the intermediate element (300) which faces away from the slot (11), a further deformable intermediate element (400) is arranged, in particular clamped, between the main element (100) and the belt contact element (200), said intermediate element likewise being deformed during a relative movement of the movable belt contact element (200) and being pressed by the deformation against a portion (20a) of the seat belt (20) that lies opposite a portion (20b) of the seat belt (20) which is located in the slot (11).

11. The belt deflector as claimed in claim 10, wherein
the intermediate element is deformable elastically and/or plastically, and/or
the further intermediate element is deformable elastically and/or plastically.

12. A belt deflector, comprising
a main element which is fastenable to a vehicle structure, and
a belt contact element which is movable in relation to the main element and forms a contact surface or a contact edge for a seat belt which is to be deflected,
wherein the belt deflector has a deformable intermediate element which—during a relative movement of the movable belt contact element relative to the main element and in a direction of the intermediate element—deforms and is pressed against the seat belt by said deformation;
wherein
the intermediate element (300, 400) has two outer web portions which are arranged parallel and between which a central portion which is thicker in relation thereto is arranged,
one of the two web portions (310, 320) is plugged into a holding groove (250, 250a) in the belt contact element (200) and is held by said holding groove, and
the other of the two web portions (310, 320) is plugged into a second holding groove (150, 150a) in the main element (100) and is held by said second holding groove.

13. The belt deflector as claimed in claim 12, characterized in that
the holding groove (250) in the belt contact element (200) is adjacent to the first clamping surface (232) and the second holding groove (150) in the main element (100) is adjacent to the second clamping surface (160), and
the central portion (330) of the intermediate element (300) is clamped between the two clamping surfaces.

14. The belt deflector as claimed in claim 12, characterized in that
the second holding groove (150, 150a) in the main element (100) has a groove wall which is formed by the metal core (101), and
an opposite groove wall and a groove base are formed by the plastic (102).

* * * * *